June 3, 1941.   F. L. O. WADSWORTH   2,244,273
APPARATUS AND METHOD OF FABRICATING ARTICLES FROM MOLTEN GLASS
Original Filed March 4, 1935   4 Sheets-Sheet 1
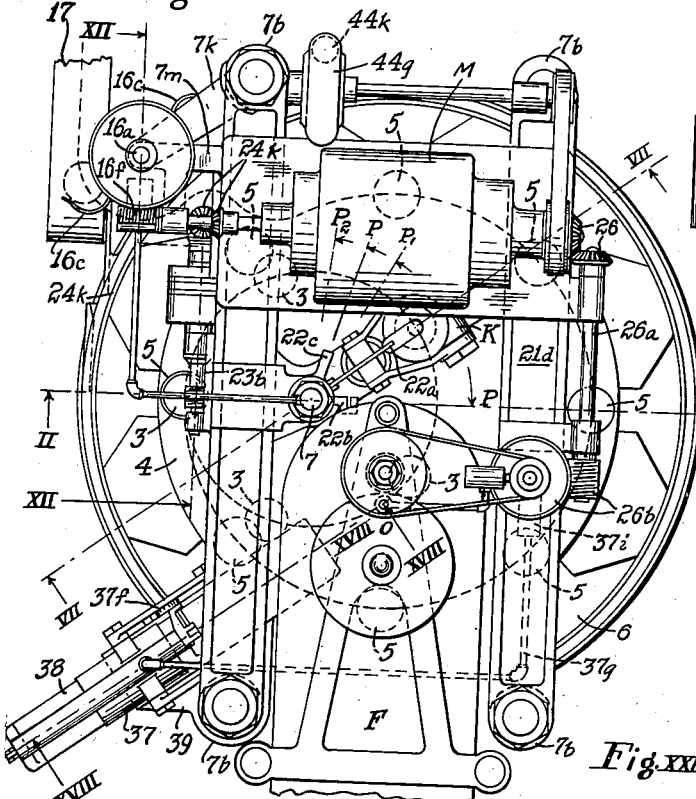
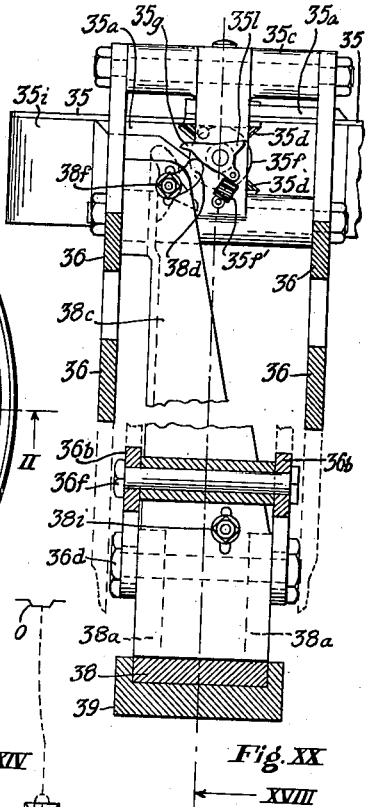
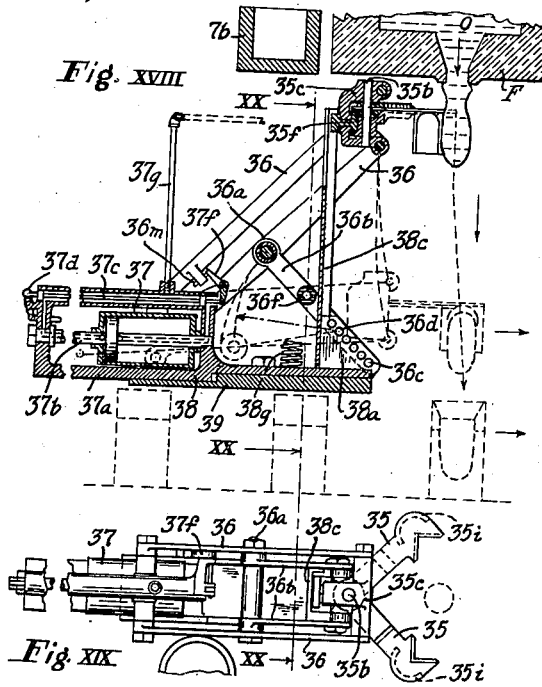
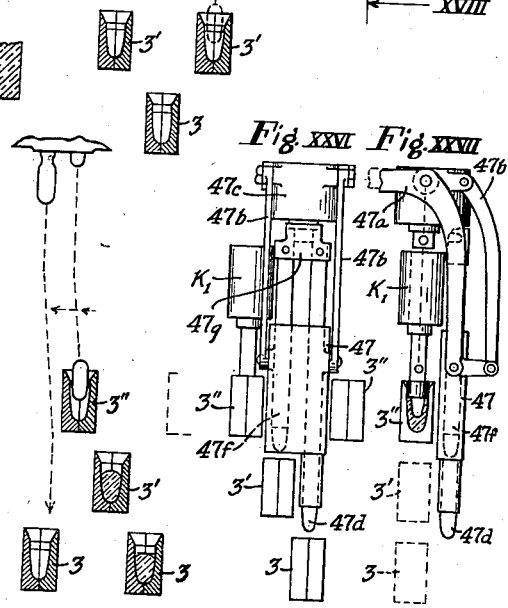
INVENTOR
Frank L. O. Wadsworth
By Green & McCallister
His Attorneys

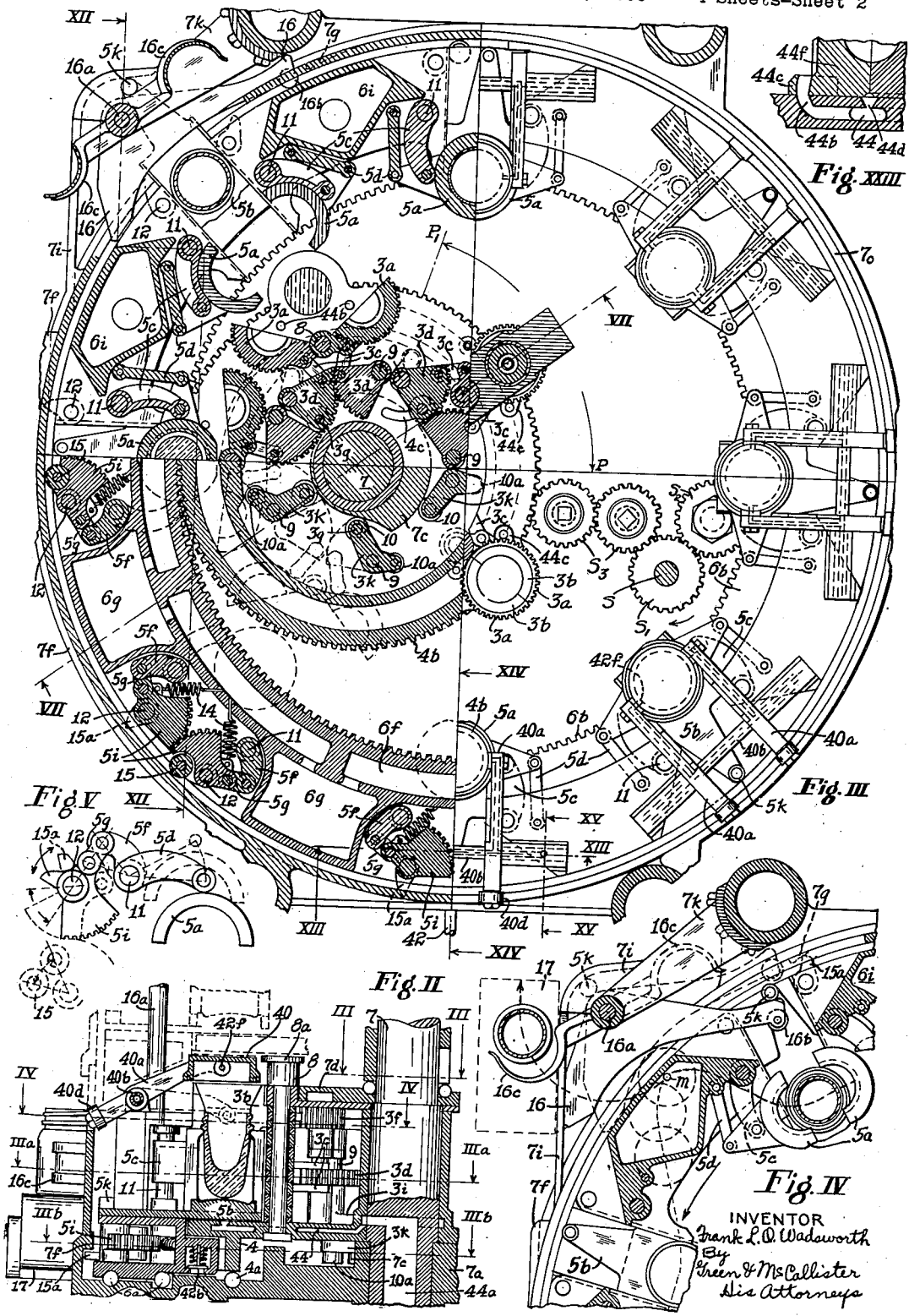

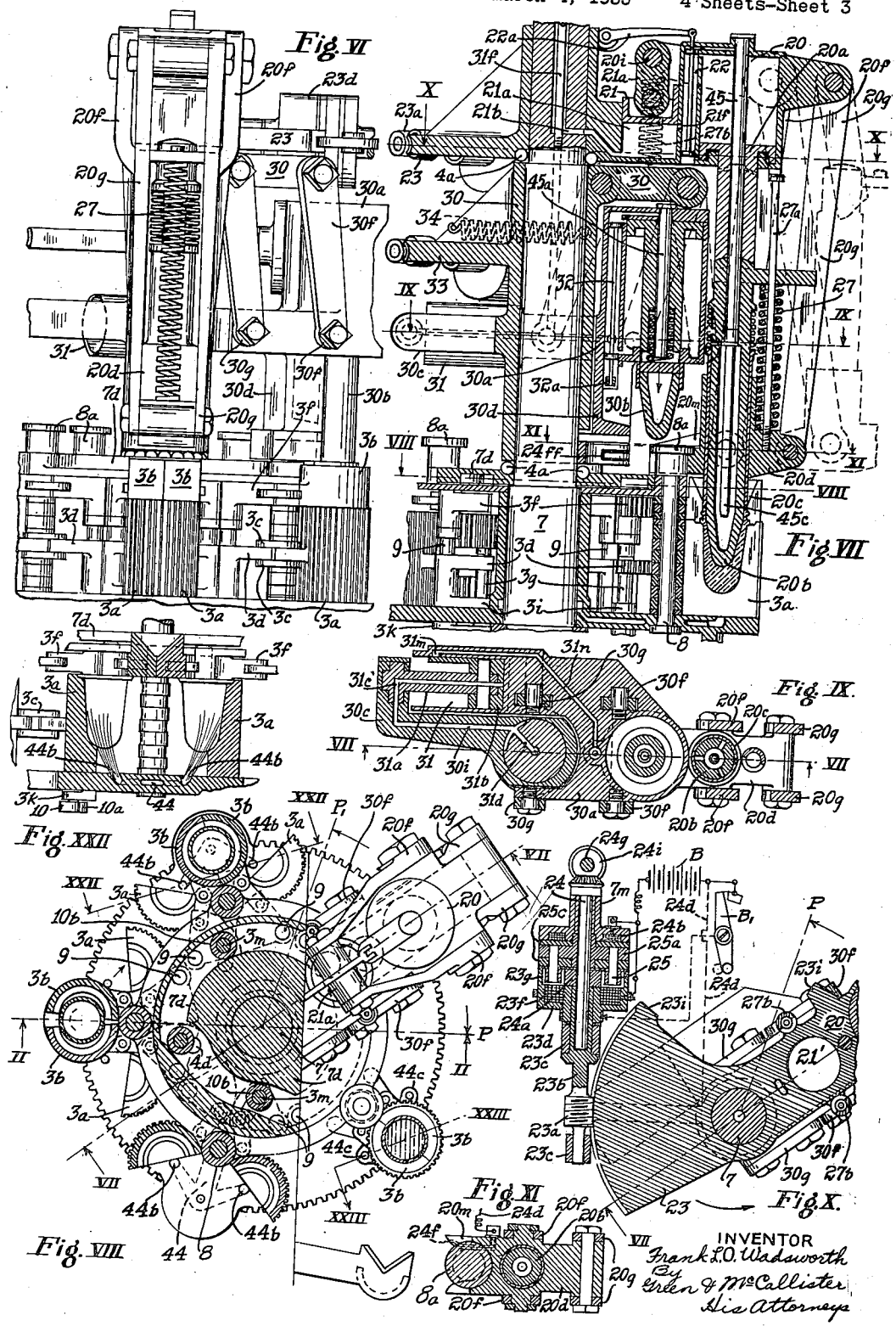

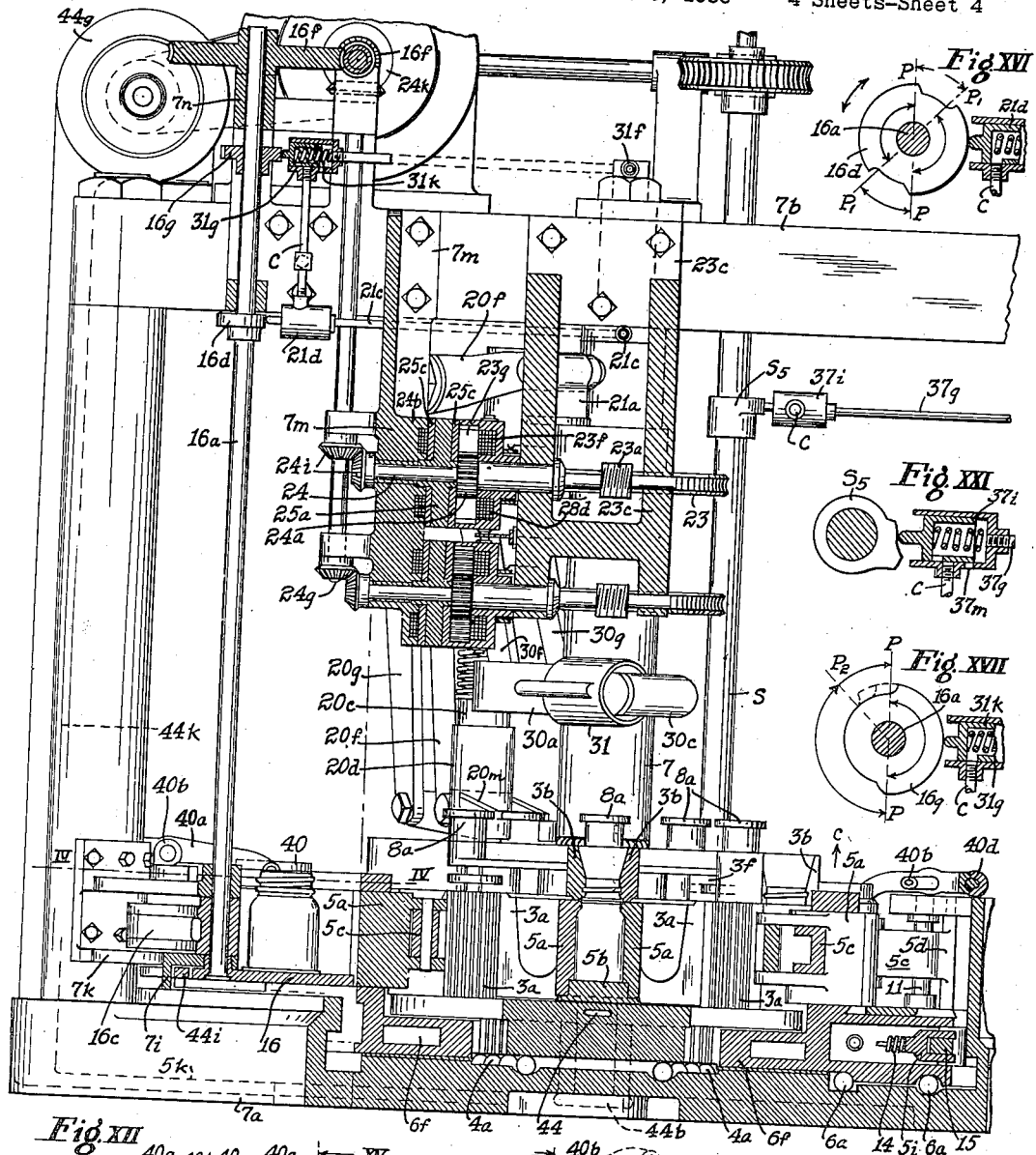
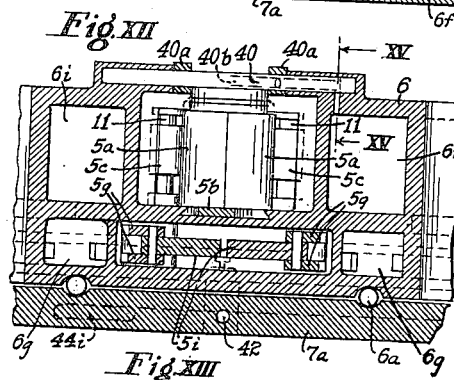
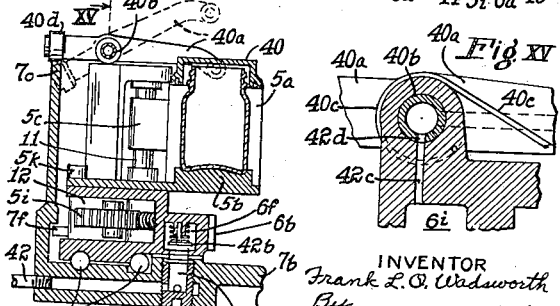

Patented June 3, 1941

2,244,273

UNITED STATES PATENT OFFICE 2,244,273

APPARATUS AND METHOD OF FABRICATING ARTICLES FROM MOLTEN GLASS

Frank L. O. Wadsworth, Pittsburgh, Pa., assignor to Ball Brothers Company, Muncie, Ind., a corporation of Indiana Application March 4, 1935, Serial No. 9,133
Renewed May 19, 1939

31 Claims. (Cl. 49—9)

My invention relates to a new species of press-and-blow machine for forming glass articles, which may be descriptively designated as an epicentric, or annular ring type, a form of which is shown in my application Serial No. 2,361, filed January 18, 1935, and in which the revolving table carrying the press molds is mounted eccentrically of a synchronously rotating hollow drum which carries the cooperating blow molds, and in such relation thereto that the paths of movement of the mold centers intersect or coincide at the point where the pressed glass blanks are to be transferred from the first to the second set of forming receptacles. The two mold tables are positively geared together in such manner that the peripheral or linear velocity of the press mold and the blow mold centers is at all times equal—regardless of whether this velocity is uniform or variable—and the driving mechanism is preferably of such a character as to permit of a smooth and continuous variation in the speed of rotation of the interconnected tables over a substantial range. The broad features of this general type of epicentric machine are claimed in my above mentioned application.

One object of my invention is to permit of the transfer of the glass blanks or "parisons" from the press molds to the blow molds while the table supports therefor are moving at a relatively high speed, and while the molds remain in fixed axial relation thereto, without the use of any auxiliary transfer arms or other variable devices for shifting the pressed blank radially or transversely of its supporting and receiving receptacle.

Another associated purpose of this invention is to provide for the initial pressing, or shaping, of the glass in the press molds, without interrupting the continuous movement of the mold tables, and without changing the relative position of the press molds thereon. A subsidiary object of this provision is to effect this pressing operation with not more than two plunger mechanisms which cooperate alternately with successively presented molds on the continuously revolving press mold table.

A further object of these improvements is to provide a shear mechanism which is adapted to not only sever successive mold charges from a continuously flowing stream of molten glass, but to also deliver these severed mold charges to the continuously moving press molds in such manner that at the instant of delivery there is no substantial lateral movement of the charge with respect to the receiving receptacle; and thereby substantially increase the possible speed of movement of the molds during this charging operation.

Still another object of the present invention is to continuously cool the press molds—both when they are closed to receive and shape the successively delivered charges of molten glass and when they are opened to permit of the transfer of the shaped charges to the blow molds—and to also automatically cool the press plungers after each pressing operation for the purpose of materially increasing the rate of output of each pressing unit, and thereby increasing the maximum capacity of a machine of any given size.

An additional feature of my improvements is the provision of take-off mechanism which is adapted to remove the finished article from the opened blow mold and deliver it to a conveyor on which it may be carried to an annealing lehr while its interior is still in a semi-plastic condition.

Other objects and purposes of this invention will be made apparent by the following detailed description of the construction and mode of operation of one illustrative embodiment of my improvements, which are directed in general to providing an apparatus that has a substantially increased rate of production per unit of floor space, and a correspondingly decreased cost of operation per unit of production.

Fig. I is a general plan view of one exemplary embodiment of my improved forming apparatus, as viewed from a plane above the feeder forehearth;

Fig. II is a partial sectional elevation on the plane II—II of Fig. 1;

Fig. III is a composite three-plane plan view, in which the right hand half shows the parts on and below the plane III, the upper left hand quarter is a section on the plane IIIa—IIIa, and the lower left hand portion is a section on the plane IIIb—IIIb of Fig. II;

Fig. IV is a partial horizontal section on the plane IV—IV of Fig. II;

Fig. V is a semi-diagrammatic view of the actuating mechanism for one of the blow mold units;

Fig. VI is an elevation of a portion of the apparatus, as viewed from the right hand side of Fig. I, but with the parts in a different position from that there shown;

Fig. VII is a vertical section on the plane VII—VII of Figs. I and III (see also Figs. VIII, IX and X);

Fig. VIII is another composite drawing, in which the portion to the right of the vertical dividing line is a plan view of the press mold table and press plunger mechanism, and the portion to the left of that line is a horizontal section on the plane VIII—VIII of Fig. VII;

Figs. IX and X are two sectional plan views on the respective planes IX—IX and X—X of Fig. VII;

Fig. XI is a sectioned detail on the plane XI—XI of Fig. VII;

Fig. XII is an offset sectional elevation on the double plane XII—XII of Figs. I and III;

Fig. XIII and Fig. XIV are other sectional elevations on the respective planes XIII—XIII and XIV—XIV of Fig. III;

Fig. XV is an enlarged detail section on the vertical plane XV—XV of Figs. III and XIII;

Figs. XVI and XVII are semi-diagrammatic views of certain valve control elements for operation the press plunger mechanisms;

Fig. XVIII is a sectional elevation, on the plane XVIII—XVIII of Fig. I, of the accelerated delivery shear mechanism which constitutes a part of my improved apparatus;

Fig. XIX is a plan view of this mechanism;

Fig. XX is an enlarged sectional view on the vertical plane XX—XX of Figs. XVIII and XIX;

Fig. XXI is a semi-diagrammatic view of the valve element of the pneumatically actuated shear mechanism;

Figs. XXII and XXIII are detail sections on the vertical planes XXII—XXII and XXIII—XXIII of Fig. VIII;

Fig. XXIV is a diagrammatic illustration of the manner of feeding successive charges of glass to a "double deck" arrangement of staggered molds;

Fig. XXV is a similar illustration of the charging of the successive molds of a triple deck assembly of forming units (produced by the superpositioning of three angularly spaced banks of such units as are shown in Figs. I, II, III, IV, X, XII and XIII) from a "twin orifice" feeder; and Figs. XXVI and XXVII are semi-diagrammatic front and side elevations of the press plunger mechanisms which are employed in conjunction with this "three deck" embodiment of my present invention.

For convenience of comparison it may be noted that the relative scale of the different figures of the illustrative drawings are as ½ (Fig. XV); ¼ (Figs. XVI, XVII, XX, XXI and XXIII); ⅕ (Fig. V); ⅙ (Figs. II, III, IV, VI, VII, VIII, IX, X, XI, XII, XIII, XIV and XXII); 1/10 (Figs. I, XVIII and XIX); and 1/15 (Figs. XXIV to XXVII inclusive); but it will, of course be understood that both the actual and the relative dimensions of various parts of this exemplary apparatus may be varied within wide limits without altering the essential features and operative characteristics of the herein described improvements; and no particular significance is to be attributed to the specific size relationships herein shown.

In the exemplary construction shown in Figs. I to XXIII inclusive—which illustrates a single deck assembly of forming units with their associated mechanisms—there are five press molds 3—3, etc., which are supported, at angular intervals of 72° on an inner cylindrical table 4; and eight cooperating blow molds 5—5, etc., which are carried by an outer annular table 6. The press mold table 4 is revolvably mounted on a stationary vertical column or post 7 which is rigidly secured at opposite ends to the lower and upper members 7a and 7b of the machine frame. The table 4 is supported by an end thrust ball bearing 4a; and the blow mold table 6 is rotatably mounted on two rows of balls 6a, which are also carried by the base plate 7a, and which serve both as a radial guide bearing and an end thrust support for the outer table. The two tables are interconnected by external and internal gear elements 4b and 6b, whose pitch radii are the same as the respective distances of the axes of the molds 3 and 5 from the axes of rotation of the tables 4 and 6; so that the centers of these mold units are constrained to move at the same peripheral speed, and their paths of movement will intersect or coincide at the point of pitch contact (T) between the gear elements 4b and 6b. An inspection of Figs. I, or III, shows that the molds 3 and 5 are so positioned on their respective tables (4 and 6) that each cooperating pair of these forming units are brought successively into coaxial relationship at this point of contact or tangency; and that, because of the epicentric positioning of the table axes, the paths of movement of the mold centers are nearly coincident over a substantial arc on each side of that point.

Each of the press mold units comprises a twin pair of body sections 3a—3a, and a twin pair of neck ring sections 3b—3b, which are all coaxially mounted on a vertical pintle bolt 8 that connects the top and bottom platforms of the table 4, and is provided at its upper end with a flanged head 8a. Each pair of body sections 3a—3a is connected, by the links 3c—3c, to a pair of interengaged gear sectors 3d—3d, which are provided with long sleeve hubs that are secured to the lower portions of vertical shaft elements 9—9; and each pair of neck ring sections (3b—3b) are similarly connected to a second pair of intermeshed gear sectors 3f—3f whose elongated hubs are pivotally mounted on the upper portions of the shaft elements 9. One of each pair of the gear sectors 3d is provided with a downwardly extending stud pin 3g which is also supported by a laterally extending arm 3i, at the lower end of the corresponding gear hub (see Fig. VII), and which projects through one arcuate slot 4c (see Fig. III) in the bottom platform of the table 4. The projecting end of the pin 3g is engaged by a bell crank lever 3k, that is keyed to the gear shaft 9 (see Figs. II, III and VII) and carries a cam roller 10 which is adapted to engage with the inner wall of a grooved cam 7c that is rigidly secured to the base plate 7a of the machine frame. The other end of the lever 3k carries a second smaller cam roller 10a which is adapted to engage with the outer wall of the cam 7c—the cam surfaces being so shaped that the engagement of the rollers 10 with the inner wall serves to close, and lock together, the body sections 3a—3a, and the engagement of the rollers 10a with the outer wall acts to unlock and open these sections (see Fig. III).

One of each pair of the neck ring gear elements 3f is provided with an upwardly extending stud pin 3m, which passes through an arcuate slot 4d in the upper plate or platform of the table 4, and which carries a cam roller 10b, that is engaged by the opposite walls of the grooved cam 7d. This second cam is also rigidly secured to the machine frame (or specifically to the machine frame post 7), and is so shaped and positioned that the engagement of the roller 10b with the inner wall serves to close and lock the neck ring sections 3b—3b, and its engagement with the outer wall acts to unlock and open these sections (see Fig. VIII).

Each blow mold unit (5) comprises a twin pair of body sections 5a—5a, which are carried by the two opposing sets of symmetrically disposed parallel links 5c—5d, 5c—5d, that are pivotally supported on the table 6, and a single bottom section 5b that is slidably mounted thereon. Each unit pair of link elements 5c—5c are keyed to vertical shaft supports 11—11 which are journaled in the top and middle platform members of the table 6, and which extend through their lower bearings to receive a pair of actuating levers 5f—5f, that are connected, by the links 5g—5g, with two interengaged gear sectors 5i—5i. These cooperating gear elements (5i—5i) are secured to short trunnion shafts 12—12 that are journaled in the middle and lower platforms of the table 6; and each of them is connected to a spring 14 which tends to pull the arms 5f—5f toward each other, and thereby open or separate the mold sections 5a—5a. One of each pair of gear sectors (5i) is provided with a cam roller 15, which is adapted to engage a stationary cam track 7f, on the vertical side wall of the machine frame, and thereby close and lock together the body sections 5a—5a. The other gear sector of each pair is provided with an outwardly projecting cam dog 15a which is adapted to engage another short section of fixed cam track 7g, and cooperate with the springs 14 in first unlocking and then opening the closed mold sections.

When the body sections 5a—5a of a blow mold are closed, the bottom section 5b thereof is locked in registered position therewith by the engagement of the lower flanged portions of the sections 5a with the raised portion of the bottom section 5b (see Figs. II, XIV, etc.). But when the sections 5a—5a are opened—in the manner just described—the bottom section 5b is left free to move radially outward and carry with it the article which has just been blown to shape in the closed mold. This radial movement is effected by the action of a wedge shaped cam plate 16, which is pivotally mounted on the lower end of a vertical shaft 16a and which is provided with a roller 16b, that rides on the outer wall of the hollow annular table member 6. This wall is provided with a series of V-shaped gate openings, which are in radial alignment with the centers of the blow molds 5, and which are of sufficient width to permit the passage of the blown articles when the bottom sections 5b are moved outwardly. When the rotation of the blow mold table brings one of these openings under the roller 16b the cam plate (16) will be permitted to move inwardly (under the action of a suitable spring not here shown) until its outer end engages the side of the auxiliary cam track 7i on the side wall of the machine frame (as shown in full lines in Fig. IV). In this position the curved end of the cam plate 16 is ready to engage the inner side of a cam roller 5k, which is mounted on the outer end of the slidable bottom section 5b of the blow mold; and as the table 6 continues to revolve the engagement of the cam plate 16 and the roller 5k moves this section (5b) radially outward in its guideways; this action being due in part to the shape of the cam plate 16, and in part to the counterclockwise rotation of that plate when the roller 16b rides up on the advancing side of the V-shaped opening in the wall of the table 6 (see Fig. III). The radial movement of the mold section 5b, and of the blown article supported thereon, continues until the cam roller 5k is carried over the vertex of the cam plate 16, and the parts have reached the positions indicated in dotted lines in Fig. IV; at which time the center of the article itself is at the point m.

The vertical shaft 16a is rotatably mounted in a V-shaped bracket 7k and in a bearing block 7m (which are respectively secured to one of the side columns and to one of the upper cross beams 7b of the machine frame), and carries a revolving "take off" device that comprises a diametrically opposite pair of semi-cylindrical hooks 16c—16c which are so positioned, and operatively timed, that they will alternately engage the finished articles, as they are brought successively to the point, m, and carry them outwardly—away from the raised forming face of the mold sections 5b, on which they have, up to this time been supported—over the surface of the cam plate 16 and the adjacent edge of the cam track 7i (both of which are on substantially the same level as the raised portion of the mold sections 5b), and onto the moving elements of a conveyor 17 by which they are transferred to the annealing lehr. The shaft 16a is driven at such a speed that it makes one-half of a revolution for each one eighth of a revolution of the blow mold table 6; and the distance from the axis of this shaft to the centers of the take off hooks is such that the peripheral velocity of these centers is approximately the same as that of the center of the blown article when it has reached the point m on the revolving table 6; but the speed of movement of the conveyor belt 17 is somewhat greater than this, so that the article will be automatically disengaged from the moving hook as soon as it reaches the conveyor, and will be carried forward out of the subsequent path of travel of the revolving take off elements (see Fig. IV).

As each hook (16c) engages one of the finished articles (at m) the associated blow mold section 5b begins to move inwardly—by reason of the engagement of the roller 5k with the auxiliary cam track 7i—and as the table 6 continues to revolve this mold section is returned to its initial operative position (Fig. IV), thus permitting the associated body sections 5a—5a to be again closed by the coaction of the roller and cam track elements 15 and 7f.

*Pressing mechanism*

My improved forming machine is preferably provided with two complementary plunger press assemblies which act alternately in shaping the charges of molten glass, that are delivered to successively presented press molds 3—3, etc., to the desired parison form, in preparation for their transfer to the finishing molds 5—5, etc. Both of these alternately acting press mechanisms are mounted to swing, or oscillate, around the axis of revolution of the press table 4 (i. e., around the center of the table column 7); and each is so constructed that it is automatically locked to the moving table, in registry with one of the press molds, and is moved therewith through a predetermined arc P—P₁, and then, at the end of this definite arcuate movement, is automatically disengaged from the table and moved back to its initial position (P) during the period of action of the complementary mechanism. These mechanisms are furthermore so designed and operated that during their advance movement (with the press table), they are frictionally driven from an independent source of power (thereby relieving the table driving mechanism from the added duty of intermittently moving the interengaged press assembly); and during their reverse or return travel, they are also driven from this same independent source, and at any desired speed relative to that of the advance movement.

I will first describe the press assembly which is shown at the right of Fig. VII and which is there illustrated as it appears in section on the plane VII—VII of Figs. I, III, VIII, etc. This assembly—which may be conveniently designated as a whole by the symbol K—comprises an overhead block 20—20, which is rotatably mounted on the upper portion of the column 7, and which is chambered to receive two reciprocable piston members 20a and 21; and a press plunger 20b, with an associated concentric follower sleeve, 20c, which are slidably mounted in a T-shaped guide head, 20d, that is suspended, from the block 20, by two pairs of parallel links 20f and 20g. The upper ends of the two links 20f—20f are provided with laterally extending arms, which are coupled together at their extremities by the spacer bolt 20i, and are connected, by the I shaped link 21a to the piston 21. The inner side of the guide head 20d is provided with a flared U-shaped fork 20m (see Figs. XI and XII) which is adapted to closely engage the head 8a of one of the pintle bolts 8, when the press plunger is moved into operative position with respect to one of the press molds 3 (as shown in full lines in Fig. VII, and to thereby lock the members 3 and 20—20m in cooperative registry with each other during the pressing operation.

The lower end of the cylinder chamber for the piston 21 is connected through the passageway and annular port 21b, to a pipe 21c, that leads to a single acting two way valve 21d, which is periodically actuated by a suitable cam 16d, on the vertical shaft 16a (see Figs. VII and XII), and which serves to control the admission and exhaust of motive fluid (which is supplied from any suitable source by the conduit C), to and from the aforesaid piston chamber. The upper end of this same chamber is connected, by the port 21f, with a vertical passageway in the block 20 that contains a balanced double piston valve 22, which serves to control the flow of motive fluid to and from the opposite ends of the cylinder for the piston 20a, and which is moved up and down, by a lever 22a that is adapted to be engaged, at the beginning and end of the oscillatory movements of the block (20), by fixed cams 22b—22c on the machine frame (see Fig. I).

The block 20 is also provided with a worm wheel sector 23, that is engaged by a worm 23a, on the horizontal shaft 23b which is journaled in a U-shaped bearing block 23c on one of the upper cross beams 7b of the main frame. As best shown in the sectional views of Figs. X and XII the enlarged end of this shaft (23b) is secured to a bell shaped steel drum 23d which surrounds a coil 23f, of insulated wire and which is provided at its outer edge with a ring of internal gear teeth 23g. A cooperating shaft 24 is coaxially journaled in the end of the shaft 23b, and in the bearing block 7m, and is provided with a gear 24a, which is operatively connected to the internal gear 23g by the planet pinions 25, that are rotatably mounted on the ring member 25a. The bearing block 7m is provided with another coil 24b of insulated wire, one terminal of which is directly connected to the bearing block, and the other of which is insulated therefrom. The opposite sides of the planet ring 25a are faced with soft iron discs 25c—25c, which cooperate respectively with the contiguous annular flanges on the bearing block 7m, and with the adjacent edge portions of the members 23g, and 24a in forming substantially closed magnetic circuits when the coils 24b and 23f are energized.

The two terminals of the coil 23f are connected to insulated contact rings, which are carried by the internal gear drum 23d, and which are engaged by insulated brushes on the bearing supports. One of these brushes is permanently connected, in parallel with the insulated terminal of the coil 24b, to one pole of a suitable source of electric current (e. g. the battery B); and the other brush is connected to the second pole, through a make and break switch B₁ that is opened and closed by the engagement of the lugs 23i—23i, on the connected block and worm wheel members 20—23, with the arm of the switch B₁. This last mentioned pole is also connected by the insulated wire 24d, to the terminal of an insulated contact block 24f that is set in the forward side of the fork 20m of the guide head 20d (see Fig. XI); and when the parts 8a and 20d—20m are mechanically engaged (as shown in Figs. VII and XI), the circuit through the coil 24b is closed (viz. through the frame of the machine, the table members 3—8, etc., and the insulated connections last described) and the planet pinion ring 25a is then magnetically locked to the stationary bearing block 7m.

The connected press and blow tables 4 and 6 are driven in unison from a vertical shaft S by means of the pinion S₁, the intermediate pinion S₂ (which meshes with the internal gear 6b on the blow table 6), and the two interengaged pinions S₃—S₃ (which connect the pinion S₁ with the external gear 4b on the table 4); the axes of the gears S₂ and S₃ being so adjusted as to equalize the driving pressure on the teeth of the gears 4b and 6b, and thereby obtain a very smooth and uniform driving action; and the pitch diameter of the gear S₁ being such that the tables are moved synchronously through the angular interval between the centers of two successive molds, for each revolution of the shaft S. The table actuating shaft S, and the take off shaft 16a are both directly connected to a suitable variable speed motor M, which is preferably mounted on the upper cross beams 7b of the machine frame, and which is provided with a rheostat or equivalent control device for regulating its velocity of rotation (R. P. M.). The motor shaft is positively coupled to the shaft S by means of the mitre gears 26, the countershaft 26a and the worm and worm wheel elements 26b, and is likewise connected to the shaft 16a by the worm and worm wheel gears 16f—16f.

The shaft 24, to which the pinion 24a is attached, is connected to a vertical shaft 24g by means of mitre gears 24i; and the shaft 24g is either driven from the main shaft of the motor M (through a second pair of mitre gears 24k— see Figs. I and XII), or from an entirely independent source of power. In either case the tables (4 and 6) and the press assembly frame (K) are, in effect, independently actuated, because the table driving shaft (S) is positively driven (by the train of gearing 26—26a—26b, etc.) and the worm shaft 23b is frictionally driven, from the shaft 24, by means of the magnetic clutch elements; and the motor M (if only the one is used) is sufficiently powerful to operate both driving trains without overloading.

The operation of that portion of the apparatus which has thus far been described is as follows: When a charged press mold 3 approaches the point P (at the beginning of the pressing arc) the valve 21d is moved (by the timer cam 16d on the shaft 16a) to admit motive fluid to the space below the piston 21 and the latter is raised to swing the link system 20f—20g inwardly, thus bringing the press plunger 20b into alignment with the piston rod extension of the piston 20a, and concurrently engaging the forked portion, 20m of the guide block 20d with the flanged head 8a of the adjacent mold pintle bolt 8. As soon as the head 8a touches the insulated contact element 24ff (and therefore as soon as the moving table tends to impart any rotary movement to the press plunger assembly) the circuit through the coil 24b is closed and the ring 25a is locked to the stationary bearing member 7m. As this time the switch B₁ is open (see infra), and the current through the coil 23f is therefore broken, and under these circumstances the locking of the previously free ring gear elements 25—25a, immediately imparts a rotary movement to the worm shaft 23b (in a direction opposite to that in which the shaft and gear elements 24 and 24a are revolving) and this in turn moves the worm wheel 23, and the associated press plunger assembly in the same direction, and at the same speed, as the revolving table 4; so that, even before the complete engagement of the members 8 and 20d, the cooperating table and press assembly parts are moving in unison, and there is no shock or jar incident upon such engagement. The attainment of this result may be facilitated, if desired, by so proportioning the elements of the two driving trains, for the shafts S and 24, that the latter tends to move the worm 23 forward at a slightly greater angular speed than the table 4, and thus imparts a very slight pull— rather than any slight drag—on the positively driven table assembly.

The lifting of the piston 21 uncovers the port 21f and thus admits motive fluid to the chamber of the valve 22, and since the valve is at this time in the position shown in full lines in Fig. VII (see infra), this motive fluid passes to the upper end of the cylinder containing the piston 20a, and moves it downward until its piston rod extension engages the upper end of the press plunger 20b and depresses the latter to shape the charge of glass in the associated press mold 3. As the interlocked table and press assembly approaches the end (P₁) of the pressing arc, the valve shift lever 22a is engaged by the fixed cam 22c on the machine frame, and the valve 22 is moved downward to admit live motive fluid to the lower end of the piston chamber, and concurrently open the upper end thereof to the exhaust. This raises the piston 20a and allows the plunger 20b to be lifted by the return spring 27 until its upward movement is arrested by the head of the adjustable stop bolt 27a. The valve 21d is then moved to cut off connection with the source of fluid pressure and open the pipe 21c to the atmosphere, thus permitting the piston 21 to be returned to its lower position by the action of the return springs 27b. This return movement swings the link system 20f—20g, together with the suspended block 20d, outwardly to the dotted line position shown in Fig. VII, thus disengaging the press assembly from the table 4, and also breaking the connection between the pintle bolt head 8a and the contact element 24ff. This interrupts the circuit through the coil 24b and releases the planetary gear ring 25a from the fixed bearing member 7m, thus permitting it to revolve freely on the shaft 24 without imparting any further movement to the worm shaft drum 23d. The latter will however continue to revolve, under its own momentum, until the further slight advance of the worm wheel 23 causes the lug 23i to complete the closure of the switch B₁ and thus close the circuit through the coil 23f.

When this is done the gear elements 23g, 24a, and 25—25a, will all be magnetically locked to each other, and the worm and worm shaft 23a—23b will be revolved in the same direction as the shaft 24, thereby rotating the worm 23 in a reverse (counterclockwise) direction and returning the connected press assembly frame to its initial position (P). As the frame approaches this position the valve shift lever 22a is engaged by the other fixed cam 22b on the machine frame, and the valve 22 is again lifted to the full line position of Fig. VII. At the end of the return movement the lug 23i on the worm wheel 23 engages and opens the switch B₁ thus breaking the circuit through the coil 23f and leaving the planetary gear ring 25a free to revolve on the shaft 24 without imparting any further rotation to the worm and worm wheel elements 23 and 23a. The press assembly will then remain at rest until the next successive action of the control valve 21d again admits motive fluid to the lower side of the piston 21 and thus initiates another cycle of the above described operations.

It will be obvious that the time required for the return of the press assembly is less than that occupied in its forward movement; and that the ratio of these times may be varied to any desired degree by correspondingly varying the relative pitch diameters of the gears 23g and 24a. If, therefore, I make the pressing arc P—P₁ somewhat less than that shown in Figs. I and III (i. e., less than the angular interval P—P between two press mold centers); and make the return movement sufficiently rapid (by increasing the ratio between the pitch diameters of the gears 23g and 24a) I can reduce the time of the above described cycle to less than that required for moving successive molds into receiving and pressing positions; and under such circumstances I can perform all of the shaping operations with one oscillating plunger assembly.

When operating in this manner the cam element 16d must be of the form shown in Fig. XVI; i. e., it must be so shaped as to actuate the control valve 21d twice in each revolution of the shaft 16a, or once for each movement of the press table through the angular interval P—P between successive mold centers.

The shaping of all of the mold charges with a single pressing mechanism necessarily limits the time during which the press plunger can remain in contact with the glass; and in order to avoid this limitation—without decreasing the speed of rotation of the press mold table, or reducing the number of molds thereon—I have here provided a second, or complementary, pressing assembly, (K₁), which as already stated, is adapted to act alternately with the one above described and which is moved forward to press the charge in an associated mold while the other assembly (K) is being returned to its initial position. This makes it possible to use a pressing arc, P—P₂ (Fig. I) which may be considerably longer than the angular interval P—P between the press mold centers—because of the increased speed, and decreased time, of return which is obtained by the use of the epicyclic train of gearing between the shafts 23b and 24—and also makes it possible (see infra) to arrange the successive molds en echelon, in two or more superimposed banks or tiers (as indicated diagramatically in Figs. XXIV to XXVII, inc.), and thereby obtain a more compact arrangement.

The second (complementary) press plunger assembly K₁—which I have illustrated both as it would appear in section, on the plane VII—VII (when radially aligned, on its return movement, with the forwardly moving press assembly K); and also as it appears in elevation at, or near, the end (P₁) of its advance movement, (with the press assembly K at the beginning (P) of its pressing arc)—comprises a supporting head 30, which is rotatably mounted on the press table column 7; a cylinder block 30a which is suspended from this head on two pair of parallel links 30f—30g, and which is provided with the reciprocable piston-plunger 30b; and a locking cylinder 31, which forms an integral part of the cylinder block 30a, and which cooperates with a piston 31b, that is flexibly coupled to a projecting arm 30c, on the head 30, by a connecting rod 31a. The cylinder block 30a has a downwardly extending arm 30d which is provided at its lower end with a flared U-shaped fork similar to the one (20m) shown in Fig. XI, that is adapted to engage the flanged head 8a of an adjacent press mold pintle bolt (when the members 30a—30b—30d, etc., are swung outwardly on the supporting link system 30f—30g, etc.) and to thereby lock the complementary press assembly to the press mold table 4. Motive fluid is admitted to the front (closed) end of the cylinder 31 through the communicating passageways 31c—30i, in the connecting rod and arm elements 31a—30c, and the annular port and passage 31d which leads to a pipe 31f that passes upwardly through the central opening 21b in the column 7, and is connected at its upper end with the control valve 31g (see Figs. I, IX and XII). This valve, like the valve 21d, is actuated by a suitable cam 16g on the positively driven take off shaft 16a; and both valves (21d and 31g) are so constructed that when they are moved to the right (by the cam 16d or 16g) the pipes 21c or 31f are connected to a suitable source of fluid pressure (e. g. the compressed air conduit C), and when moved to the left (under the joint influence of the fluid pressure on the head of the valve and the tension of a return spring 31k) the said pipes are opened to the atmosphere (see Figs. XII, XVI and XVII).

The cylinder 31 is provided, at an intermediate point in its length, with a side port 31m, that is connected, by the passage 31n, with a vertical chamber in the cylinder block 30a, which contains the balanced double piston valve 32. This valve is similar, in construction and mode of action, to the valve 22 (supra), and serves to control the admission and exhaust of motive fluid, to and from the ends of the chamber in which the piston plunger 30b reciprocates; and, like the valve 22, is moved up and down by a valve shift lever 32a that is engaged, near the ends of the advance and return movements of the head 30, by fixed cams on the frame of the machine.

The head 30 is provided with a worm wheel sector 33, which is of the same form as the corresponding sector 23 of the head 20 (see Fig. X), and which is moved by a worm-gear-magnetic-clutch-drive mechanism, that is, in all material respects, identical with the one already described (supra).

The operation of the complementary press assembly K₁ is substantially the same as the operation of the assembly K; and requires, therefore, only a very brief explanation. As already stated, Figs. VII (VIII) and IX show the position of the parts of the assembly K₁ during its return to the initial position P (while the assembly K is moving forward with the table 4); and as it approaches the end of this return movement the valve shift lever 32a is engaged by the adjacent cam on the machine frame to lift the valve 32 to the top of its stroke; and immediately thereafter the associated switch (B₁) of the magnetic control mechanism is opened to arrest the clockwise rotation of the members 30—33, etc. When the next press mold 3 arrives at the proper position the valve 31g is moved to the right (to the position shown in Fig. XVII) and live motive fluid is thus admitted to the front end of the cylinder 31 to swing the cylinder block 30a forward, on its supporting links 30f—30g, and bring the press plunger 30b into radial alignment with the path of movement of the press molds 3—3, etc. This movement also brings the U shaped fork in the cylinder block extension 30d into engagement with the then adjacent pintle bolt head 8a, and as soon as the insulated contact terminal 24ff (which corresponds to the terminal 24f in the head 20d), touches the member 8a the magnetic clutch driving mechanism is actuated to advance the associated worm wheel member 33, and rotate the press assembly K₁ in unison with the moving table 4 (as already explained in the description of the assembly K supra).

The forward movement of the cylinder 31 (relative to the piston 31a) uncovers the port 31m and thus admits live motive fluid to the top of the piston plunger member 31b, thereby depressing the latter to shape the charge of glass in the subjacent mold 3. As the complementary press assembly approaches the end of its pressing arc the valve shift lever 32a is engaged by the associated cam in the machine frame, and the valve 22 is moved down (to the full line position of Fig. VII), thus admitting live motive fluid to the lower end of the plunger cylinder and lifting the plunger 30b out of the mold. At the end of the advance swing of the press assembly K₁ the valve 31g is moved to the left (full line position of Fig. XII) to exhaust the cylinder 31; and the cylinder 30a is then swung inwardly by the springs 34, thus disengaging the forked member 30d from the pintle bolt head 8a, and concurrently breaking the contact between it and the insulated terminal 24ff. The head 30 and its associated parts are then returned to initial position in the same manner as the head 20 (supra) ready for a repetition of the last described cycle of operation.

It is obvious that the press assembly K₁ can be used alone (or without the assembly K) to shape all of the successively presented charges of glass in the press molds 3—3, if the pressing arc P—P₁ is made less than the angular interval (P—P) between the successive press mold centers, and if the time of the return movement is sufficiently reduced. In such a case the cam 16g, which actuates the valve 31g, must be of the same character as that shown in Fig. XVI; i. e., it must be a twin lobed cam that is adapted to open and close the valve twice in each revolution of the shaft 16a, or once for each movement of the table 4 through one-fifth of a revolution (for a five press mold assembly).

When the two complementary press assemblies K and K₁ are used in conjunction, or combination, with each other, each operates on alternately presented press molds; and the cyclic action of each therefore covers a period during which the table 4 revolves through an arc equal to twice the angular interval between two successive molds (i. e., in this case an arc of 144 degrees); and both of the cams 16d and 16g are, in that case, of the form illustrated in Fig. XVII, i. e., they are both single lobe cams which act to open and close the valves 21d and 31g only once in each revolution of the shaft 16a. As already stated the use of two complementary press assemblies enables me to use a pressing arc $P—P_2$ which is materially longer than is possible with only one press assembly; and, as indicated in dotted lines in Fig. XVII, the active lobe of the cam 16g may therefore considerably exceed 180 degrees—which corresponds to a movement of the press mold table through 72 degrees (for a five mold assembly)—because the time occupied in the return movement may be made materially less than that required for the advance (pressing) movement. It will, of course, be understood that the angular length of the worm wheel sectors 23 and 33 (and the angular spacing of the switch engaging lugs 23i—23i) must, in such cases, be made greater than that shown in Fig. X; but this involves only a structural reproportioning of these parts, and does not introduce any change in the functional action, or the operative performance, of the cooperative mechanisms.

*Shear mechanism*

The charges of molten glass are supplied to successive press molds by means of a suitable high speed feeder—preferably of the continuous forced flow (or nonretractive) type—which is mounted in a forehearth F (see Fig. I), and which delivers a stream of glass from a submerged orifice O in the floor thereof (see Fig. XVIII). This flowing stream is cut up into mold charges of the desired shape and weight by the shear mechanism which is shown in Figs. XVIII to XX inclusive, and which comprises a pair of "cat's eye" shear blades 35—35, that are adjustably mounted on the arms 35a, which are coaxially journaled on the fixed pintle bolt 35b, in the head 35c, and which are operatively connected by the bevel gear sectors 35d and the pinion 35f. The shear blade head 35c is carried by a twin pair of parallel links 36—36—36—36, that are pivotally attached, at their upper ends, to laterally extended bosses on the head 35c, and, at their opposite lower ends, to a cylinder 37, which is slidably mounted on fixed piston and piston rod elements 37a—37b, that are carried by a U shaped angle plate 38. The middle point of two opposing links 36—36 are coupled together by a spacer bolt 36a, which forms a journal bearing for the connected ends of a pair of radius guide links 36b—36b; and the opposite open ends of this link system are provided with a series of axially disposed apertures 36c—36c, etc., which may be brought into registry with a corresponding series of holes in the triangular bracket supports 38a on the inner end of the plate 38. The links 36b—36b are pivotally connected to the supports 38a by passing a trunnion bolt 36d through any desired set of registering apertures (36c), and thus varying, at will, the effective length of these radius guide arms.

The upwardly extending brackets at the outer end of the plate 38—which carry the ends of the piston rod 37b—also support a valve casing for a reciprocable double piston valve 37c, which controls the admission and exhaust of motive fluid to and from the opposite ends of the cylinder 37 (through passages in the hollow piston rod 37b); and which is moved to and fro, in its casing, by means of tappet levers 37d—37f, that are pivotally mounted on the bracket support 38. The intermediate portion of the chamber for the control valve 37c is connected, by the pipe 37g to the casing of a valve 37i, which is actuated by a cam $S_5$ on the vertical driven shaft S (see Figs. I and XII) and which is of the form shown in Fig. XXI.

The triangular brackets 38a are connected on their vertical sides by an upwardly extending flanged plate 38c, whose upper end is flared laterally to make sliding engagement with one set of the parallel links 36—36, and which carries a "one way" cam dog 38d, that is pivotally mounted on a vertically adjustable trunnion bolt 38f. The outer end of the shaft to which the bevel pinion 35f is secured, is provided with a crank arm 35g which is adapted to be engaged, and rotated, by the dog 38d, when the shear blade head 35c is moved downward, and thereby close the shear blades 35—35. When so closed the blades are held in that position by the "two way" spring 35f' that is then moved past its dead center position by the counter-clockwise rotation of the crank arm 35g; and the severed mold charge which has been cut off from the flowing stream of glass is embraced, and surrounded, on its upper end and sides of the closed shear elements 35—35 and the semi-cylindrical guard cups 35i—35i that are attached thereto.

The operation of the above described shear mechanism is as follows: When a press mold 3 has been brought to the proper position beneath the orifice O, the cam $S_5$ acts to move the valve 37i to the right, thus putting the pipe 37g into communication with the motive fluid conduit C and allowing compressed air (or other suitable medium) to pass into the casing of the valve 37c. At this time the valve 37c is set as shown in Fig. XVIII (infra) and the motive fluid is therefore admitted to the outer end of the cylinder 37 and acts to move it to the left. This rocks the parallel link system 36—36, etc., downward, under the guiding action of the radius links 36b—36b, and correspondingly depresses the shear head 35c. The first stage of this movement closes the shear blades—as above explained—and the continuation thereof carries the head and its associated parts downward at a very rapidly accelerated speed (a characteristic feature of the particular linkage system shown in Figs. XVIII and XIX), along the curved path indicated by the dotted lines of Figs. XVIII, XXIV and XXV; the degree of curvature of this path being controlled and predetermined by the adjusted length of the radius arm guides 36b. This controlled movement imparts to the severed mold charge a downward velocity which is very substantially greater than it could acquire in a free fall through the same distance; and also imparts to it a horizontal component of movement which is in the same direction as that of the revolving press mold 3. This makes it possible to deliver the charges to the receiving receptacles when the latter are moving at a relatively high speed, without the use of any guide chutes or funnels, and without any danger of impingement of the charge against the side of the neck ring or body sections of the press molds; and also makes it possible to deliver the charges at such a high velocity that their impact on the bottoms of the molds will cause them to "mushroom out" against the sides and completely fill the mold cavities with a dense homogeneous mass of molten material, even when the selected diameter of the severed stream is substantially less than that of the receiving receptacle.

As the cylinder 37, and the link system 36—36b approach the end of their outward and downward movements the end of the cylinder (37) engages the lower end of the tappet lever 37d, and moves the valve 37c forwardly to admit motive fluid to the front (inner) end of the cylinder 37 and open the opposite end thereof to the exhaust. This reversal of the motive fluid connections first cushions and arrests, and then reverses, the movement of the cylinder 37 and the associated shear head members 35c, etc., thus initiating the return of the parts to their initial position. In order to prevent any inertial "overthrow" of the downwardly moving elements 35—36—36b (which might carry the links 36—36b into, or beyond, an aligned or "dead center" position), I provide a compression spring 38g which is seated on the plate 38, and is so positioned as to elastically engage a second cross spacer bolt 36f, in the radius arm guide linkage 36b—36b—36d, and assist in both checking and reversing this downward movement.

The plate 38c carries an adjustable cam pin 38i which is adapted to engage a lug 35i on the crank arm 35g and rock the latter in a counterclockwise position, as the shear head 35c approaches the limit of its delivery stroke, and at approximately the same instant as the tappet lever 37d is actuated to move the valve 37c to its forward position. This action opens the closed shear blades concurrently with the checking and arrest of their downward movement; and the engagement of the elements 35i—38i also tends to assist the spring 38g in bringing the rapidly moving parts to rest. In order to gradually check the return upward movement the cam S₅ is preferably so shaped, and so adjusted on the shaft S, that it is moved to an intermediate position (see Fig. XXI) at about the middle of the return stroke, so as to then cut off the further flow of motive fluid to the front of the cylinder 37 and permit the completion of this movement under the expansive action of the compressed air that is thus trapped in the cylinder and the pipe connection 37g. As the parts approach their initial position the tappet lever 37f is engaged by an adjustable screw 36m on one of the links 36 and the valve 37c is thus moved back to the position shown in Fig. XVIII. This opens the front of the cylinder 37 to the atmosphere and momentarily admits a portion of the trapped fluid in the pipe 37g to the opposite end thereof, thus effecting the final arrest of the upward movement. At this stage in the operation the valve 37i is returned to its initial position thus opening the exhaust port 37m, and permitting the final residue of trapped motive fluid to be discharged to the atmosphere. This completes one cycle of action of the shear mechanism.

The curvature of the path traversed by the shear head (and by the charge of glass enclosed by the closed shear blades and the guide guard cups 35—35i) is determined and controlled by the positioning of the pivot or trunnion bolt 36d in the line of apertures 36c; and as indicated in dotted lines in Fig. XVIII, this curvature can be varied within wide limits so as to obtain any desired ratio between the downward and the lateral acceleration of the delivered charge. The base plate 38 on which the shear mechanism is mounted is itself slidably supported on a bracket member 39 that is adjustably secured to one of the side pillars of the machine frame; and by moving this bracket up or down, and rotating it, on its pillar support, by sliding the plate 38 to and fro thereon, the shear blades can be accurately adjusted to any desired position both with respect to the delivery orifice O and with respect to the path of movement of the press molds 3—3, etc.

After the charge of glass in the press mold has been shaped to form (by the action of one or the other of the press assemblies K or K¹) the body sections 3a—3a of this mold are opened, and the pressed parison blank is left hanging in the still closed neck ring sections 3b—3b. The continued and concurrent forward movement of the mold tables 4 and 6 carries the suspended parison between the opened sections 5a—5a of the cooperating blow mold 5, and as the parts approach the point of tangency between the paths of movement of the mold centers (supra) the sections 5a—5a begin to close around the suspended parison. At the point of tangency this closing movement of the blow mold sections 5a—5a is completed, and the neck ring sections 3b—3b have begun to open (see Fig. VIII), leaving the neck of the pressed blank supported on the upper edge of the closed blow mold (see Fig. II) and completing the transfer operation. As the mold tables continue to revolve, the neck ring sections 3b—3b continue to open, until the closed blow mold has been moved out of the path of the cooperating press mold; after which the sections 3a—3a—3b—3b are all closed concurrently and locked in closed position (by the synchronized action of the cams 7c and 7d) ready for the reception of another charge of molten glass.

Each blow mold 5 is provided with a movable blow head 40 which is pivotally suspended between the inner ends of a pair of arms 40a—40a, which are secured to a hollow trunnion shaft 40b that is journaled in suitable bearing blocks on the upper platform of the blow mold table 6. The blow head 40 is normally held in its raised position, above the mold 5, by a pair of torsion springs 40c (see Fig. XV) which are connected at their inner ends with the arms 40a and are secured at their other extremities to the bearing supports of the journal 40b; and each of the arms 40a is provided, at its outer end, with a cam roller 40d, which is adapted to engage a cam track 7o, on the upper edge of the cylindrical side wall of the machine frame, and thereby force the blow head 40 down on its associated blow mold 5.

The air for blowing the pressed parisons to final shape—after they have been transferred to the finishing molds 5—is supplied by a pipe 42, which is threaded into the base of the machine frame and is connected to a vertical port 42a, that is normally closed by the lower face of a hollow annular member 6f, which forms an integral part of the table 6 and of the internal gear ring 6b. The lower wall of the member 6f is perforated at intervals (e. g. under each blow mold) to receive an upwardly opening spring check valve 42b; and as each of these valve openings is brought over the port 42a the valve 42b is momentarily opened, by the pressure in the line 42, to admit a determinate quantity of blowing air to the interior of the ring 6f, and thence to the communicating chambers 6g—6i which are bounded and enclosed by the side and platform walls of the revolving drum table 6 (see Figs. II, III, IV, XIII and XIV). The chambers 6i are provided with port openings 42c (Fig. XV), which are adapted to register with cooperating ports 42d, in the wall of the hollow trunnions 40b, when the blow head 40 is moved down into contact with the subjacent blow mold 5; and when this is done the blowing air will pass from the chambers 6i, through the registered ports 42c—42d, to the interior of the hollow trunnions 40b, and then through longitudinal passage ways in the arms 40a—40a, to axial ports 42f, in the pivot bearings for the blow head 40. The air thus admitted to the space between the top of the closed blow mold and the lowered blow head will expand the suspended parison blank against the side and bottom walls of the mold sections 5a—5a—5b (see Fig. XIV) and thus effect the final shaping of the article.

The blow molds will remain closed—to allow the walls of the article to acquire the desired "set"—until they reach a point somewhat in advance of the delivery or take off arc of movement. At this point the blow heads will be released—by a depressed sector in the cam track 7o for the rollers 40d—and will be lifted by the springs 40c, thus moving the ports 42d—42c out of registry and shutting off the flow of blowing air to the lifted head. The body sections 5a—5a of the blow molds will then be opened—by the joint action of the cam elements 7g and 15a and of the springs 14—to permit the bottom sections 5b to be moved radially outward, and the finished articles resting thereon to be transferred to the lehr conveyor 17 in the manner previously described (supra).

In order to attain the highest possible speed of operation—which, in the case of glass forming machines is limited by the permissible rise in temperature of the forming molds—I have provided means for rapidly carrying away the heat transmitted to these units from the molten glass, by, or through, the combined agencies of a materially increased conduction, an accelerated radiation, a substantially augmented convection, and a latent heat absorption (vaporization); all of which effectively cooperate in attaining the desired cooling action. The increased conduction effect is obtained (in the case of all the molds 3 and 5) by making both the molds themselves and the table supports therefor unusually heavy and massive. This is made possible, in the practice of my invention, by the continuous uninterrupted movement of these parts, and the consequent avoidance of the kinetic inertial effects which present troublesome problems in the operation of "start and stop" machines, and which can only be minimized by keeping the moving parts as light as possible. In the case of the press molds 3 I substantially increase the continuous dissipation of heat by radiation in two ways, to wit: I provide the external surfaces of the mold sections with closely spaced vertical ribs or fins, which are preferably formed by cutting away the outer hard "skin" of the mold casting, and I then subject this surface to an oxidizing or sulphidizing treatment, to produce a dull dead black finish which has a very high coefficient of radiation. I further make provision for successively subjecting the interior and the exterior surfaces of the opened and closed press mold sections to continuous blasts of cooling fluid, which are all directed upwardly in order to supplement, and not oppose, the effects of natural convection currents.

The manner of attaining the last described object—i. e., a forced convection cooling of both the inner and outer mold surfaces—is best shown in Figs. II, XXII and XXIII. The lower platform of the table 4 is provided with a plurality of radially disposed rectangular passageways 44, which are in constant communication, at their inner ends, with a central opening 44a in the lower end of the table supporting column 7; and which terminate, at their outer ends, in laterally extending branches that lead to upwardly inclined and outwardly flared apertures 44b—44b in the surface on which the molds 3 are supported. These apertures are so located that when the body sections of the press molds are opened they are adapted to direct currents of cooling fluid against the inner surfaces of the said sections (see Figs. VIII and XXII); and when the press molds are closed the apertures are brought into registry with openings in projecting lugs 44c—44c that are attached to the lower ends of the body sections 3a—3a (see Figs. III, VIII and XXIII). The openings in the lugs 44c are so shaped as to deflect the currents issuing from the apertures 44b upwardly and inwardly over the corrugated outer surfaces of the closed mold sections 3a (see Fig. XXIII). The outer ends of the passages 44 may also be provided, if desired, with flared apertures 44d, which are positioned in axial alignment with the centers of the molds 3; and which serve, when the body sections 3a are opened, to direct currents of fluid upwardly against the lower end of the suspended parison blanks—and thereby aid in both supporting and cooling them—as they pass from the pressing zone to the transfer point—and which also serve, when the molds are closed, to permit the cooling fluid to impinge against the bottom surfaces of the body sections and to escape through shallow radially cut grooves 44i—44i therein.

A suitable cooling fluid—e. g. air charged with a mist of vaporizable liquid—is supplied to the central opening (44a) in the table column 7 from any suitable source. In the exemplary construction here illustrated a continuous supply of low pressure air is delivered by a high speed centrifugal blower 44g, which is driven from the motor M, and which is connected to the opening 44a by the vertical delivery pipe 44k, and the horizontal passageway 44i in the base plate 7a of the machine frame. This air can be impregnated with a fog of finely divided liquid particles from a spray of water injected into the inlet port of the blower 44g; and when this mixture of air and fog impinges on the heated mold surfaces the latter are very effectively cooled both by forced convection currents and by the immediate vaporization of the liquid particles.

The accelerated cooling of the mold units—by the increased conduction, radiation, convection and vaporization action above described—enables me to very materially increase (in some cases by 100% or more), the possible rate of output of the machine per mold; and thereby obtain a much larger production from a given number of forming units (e. g. 5 press molds and 8 blow molds), or to conversely obtain the same output from a smaller number of these units. In either case the operating efficiency of the machine is substantially increased, and the size of the machine per unit of output is materially reduced; the attainment of this last result being substantially aided (as before explained) by the epicentric arrangement of the cooperating press and blow mold tables.

A high speed of operation also makes it desirable to make provision for accelerating the cooling of each press plunger (particularly when only one is used), and in the practice of this invention, I accomplish this by making each plunger hollow, and discharging the exhaust air from the upper end of the plunger piston chambers through these hollow pressing members. This is done by closing the upper ends of the chambers in which the valves 22 or 32 are mounted and connecting these closed ends to hollow tubes 45 (or 45a), which are rigidly fixed in the centers of the press plunger cylinders, and which slidably engage with the hollow interiors of the plunger piston members 20a—20b (or 30b). The intermediate portions of these members are provided with radial ports, which connect the interior of the plunger to the outside air; and when the valve 22 (or 32) is moved down (to effect the return of a piston plunger member to its upper position) the compressed motive fluid above the piston is discharged through the downwardly extending tube 45 (or 45a), into the lower end of the corresponding plunger, and then escapes through these ports to the atmosphere. In the case of the first described press assembly (K), where the piston rod of the piston 20a is separably connected to the press plunger 20b, I preferably provide the latter with an auxiliary tube 45c which is fixed, at its upper end, in the said member (20b) and which is extended downwardly to a point adjacent the lower end thereof, so as to obtain a more effective discharge of the exhaust air against the hottest portion of the pressing member.

The motive fluid which is used in the pressing operations is preferably at a high pressure, because it is desirable to make the press cylinders—as well as all other parts of the oscillating press assemblies—as small and as light as possible, (to minimize inertial effects at the beginning and end of their oscillatory movements); and when this high pressure fluid (e. g. compressed air) is exhausted and expanded it will be greatly reduced in temperature, and will therefore be in a condition to effectively cool the heated ends of the plunger members against which it is discharged. This cooling effect may, if desired, be augmented by charging the high pressure fluid in the supply conduit C with water vapor or mist.

In the construction shown in Figs. I to XXIII, inclusive, I have illustrated my invention as applied to a single deck arrangement of epicentrically positioned press mold and blow mold tables—i. e. one in which all of the forming units are arranged on one level—but reference to the semi-diagrammatic Figures XXIV to XXVII inclusive will make it apparent that this invention may also be embodied in a "double deck" or a "triple deck" construction, in which the press and blow molds are arranged en echelon, in two or more superimposed tiers or banks 3—3'—3'';—i. e. arranged in staggered or interdigited relation on two or more levels—and are supplied with glass from either a single orifice feeder (Fig. XXIV) or a twin orifice feeder (Fig. XXV). This multiple deck construction is made up by the vertical superposition of two or more such table assemblies as have been already described (supra)—as indicated in part in dotted lines in Fig. II—in such angular relationship that the molds on successive decks are advanced approximately by one half, or one third, of the angular interval between the molds on the adjacent deck (see Figs. XXIV and XXV). This makes it possible to deliver successively severed charges of glass to successively presented molds of the different banks, provided only that the platform supports for the upper row, or rows, of press molds are cut back (between the molds) to clear the throat or neck openings of the molds below. It will be understood of course that in this multiple deck construction all of the supporting platforms for the superimposed banks of press molds 3—3'—3'' are structurally connected to form a substantially integral table member, which revolves as a unit on its bearing supports (e. g. 7 and 4a), and which is driven by a single gear (4a) that is attached to, or forms a part of, the lowermost platform; and that all of the superimposed platform supports for the corresponding banks of blow molds (5—5'—5'') are likewise connected, supported and driven as one structural unit.

In the case of a double deck construction, such as has just been described, the charges of glass in the upper bank of press molds (3') are shaped to form by a plunger assembly similar in all respects to the one previously designated by the symbol $K_1$; and the glass delivered to the lower tier of molds (3) is shaped by a press plunger assembly corresponding in detail to the one first described (K), save only that the detachable plunger member 20b, and its associated supports are sufficiently lengthened to properly cooperate with the mold assembly on the lower level. In the case of a "triple deck" construction, such as indicated in Figs. XXV, XXVI and XXVII, the press assembly for shaping the glass charges in the uppermost row of molds 3'' may also be identical with the one referred to as $K_1$; but the glass in the two lower tiers of press units 3 and 3' is shaped to form by a double plunger assembly, which acts simultaneously on the charges in two adjacent molds 3 and 3', and which comprises a single guide head 41, which is suspended, on the two pair of parallel links 41a—41b, from the large cylinder block 41c (corresponding to the block 20 of assembly K); and two press plungers 41d—41f, of different lengths (to cooperate respectively with the mold units 3 and 3'). These pressing members (41d—41f) can be simultaneously actuated—when swung into operative position over the molds 3 and 3'—by means of a single cylinder-and-piston assembly which is adapted to be engaged with an equalizing cross head 41g that connects the upper ends of the plungers 41d and 41f and serves to balance the pressure to which they are subjected by the single pneumatically actuated piston. The links 41a are connected to the piston of an auxiliary cylinder (corresponding to 21a) which serves to swing the guide head 41 into and out of operative position with respect to the press mold table and the two tiers of press molds 3 and 3'; and in all other essential respects the double plunger assembly last described corresponds structurally and functionally to the one designated by the symbol K (supra).

With the foregoing disclosure as a guide engineers and others skilled in this art will be enabled to utilize the characteristic features and operative advantages of my present invention in many other forms of glass forming machines. It will also be apparent, to such skilled workers, that certain features of the herein described improvements are applicable to press machines per se; viz., machines in which the shaping of the glass articles is effected solely by pressing (i. e., without any subsequent blowing action); and that when so applied the advantages attained are comparable and commensurate with many of those herein set forth. For these reasons I do not wish to limit this invention by reference to any particular species of construction which I have described as exemplary of my present improvements; or to have these improvements defined in any less comprehensive way than is warranted by the appended claims.

What I claim as new and desire to secure by Letters Patent is:

1. The method of fabricating glass articles from molten glass, which comprises the steps of delivering a charge of molten glass to a press mold moving continuously in a circular path, forming a pressed parison therefrom in such mold, transferring the pressed parison to a blow mold moving continuously in a circular path which surrounds the path of travel of said press mold, blowing it to shape therein, and then removing the blown article therefrom, wherein during such transfer and removal the parison is introduced on one side of the blow mold and during such removal the blown article is delivered from the other side of the said mold.

2. In a method of fabricating blown articles from molten glass, the steps of projecting a charge of molten glass into a press mold moving continuously in a circular path, pressing the charge within such mold to form a parison, transferring such parison to a blow mold moving continuously in a circular path which surrounds the path of travel of said press mold, blowing the parison to shape, and then in moving the blown article outwardly with relation to the center of rotation of the blow mold in removing the blown article therefrom.

3. In a method of fabricating blown articles from molten glass, the steps of projecting a charge of molten glass into a press mold moving continuously along an annular path, pressing the charge within such mold to form a parison transferring the parison to a blow mold revolving in a path surrounding the path of said press mold while both molds are moving, blowing said parison to shape and then in moving the blown article outwardly with relation to the center of rotation of the blow mold while such mold is moving, to remove such article therefrom.

4. In a glass fabricating machine, the combination of a rotatable table, a series of press molds carried thereby, a second rotatable table, a series of blow molds carried thereby and located eccentrically of said first mentioned series, and means for moving both tables to bring a mold carried by one of said tables into coaxial relationship with a mold carried on the other table.

5. In a glass fabricating machine, the combination of two mold supporting tables arranged in epicentric relationship and mounted to revolve eccentrically one about the other, and means for moving both of said tables at the same peripheral speed of mold travel and thereby bringing each mold of one table into coaxial relationship with a mold of the other table during the rotation of said tables.

6. A glass fabricating machine comprising a rotating press mold table having a series of divided parison molds thereon moving in a circular path from a charge receiving station to a transfer station, means responsive to the rotation of said press table for opening and closing each of said parison molds, a rotating blow mold table, a series of blow molds carried by said table and moving in a circular path from the transfer station to a delivery station, each of said blow molds having a two-part body and a movable bottom section, means for closing each of said blow molds as it moves past the transfer station, means for opening the body sections of each blow mold as it approaches the delivery station, and means at the delivery station for moving the bottom section of each said mold outwardly with relation to the center of rotation of said blow mold table.

7. A glass fabricating machine comprising a rotating press mold table, a series of two-part parison molds carried by said table and moving from a charge receiving position to a transfer position, means for closing the sections of each said mold prior to its movement past the charge receiving position, means for preshaping the charge in each of said molds, means responsive to the rotation of said press table for opening one part of said mold prior to its movement past the transfer station, means for opening the other section of said parison mold as it moves past the transfer station, a rotating blow table, a series of blow molds carried by said table and moving from the transfer station to a delivery station, means responsive to the movement of said blow molds past the transfer station for closing said molds to transfer the preshaped mold from the parison to the blow mold, means for blowing the preshaped charge in each blow mold, means at the delivery station for opening said blow molds, and means at the delivery station for moving the ware outwardly with relation to the center of rotation of said blow table.

8. A glass fabricating machine comprising a rotating press mold table, a series of two-part parison molds carried by said table and moving from a charge receiving position to a transfer position, means for closing the sections of each said mold prior to its movement past the charge receiving position, means for preshaping the charge in each of said molds, means responsive to the rotation of said press table for opening one part of said mold prior to its movement past the transfer station, means for opening the other section of said parison mold as it moves past the transfer station, a rotating blow table, a series of blow molds carried by said table and moving from the transfer station to a delivery station, means responsive to the movement of said blow molds past the transfer station for closing said molds to transfer the preshaped mold from the parison to the blow mold, means for blowing the preshaped charge in each blow mold, means at the delivery station for opening said blow molds, means at the delivery station for moving the ware outwardly with relation to the center of rotation of said blow table, and means for removing the ware from said blow table.

9. A glass forming machine comprising a rotatable press mold table, a rotatable blow mold table surrounding said press mold table and arranged eccentrically thereto, a series of molds carried by each said table, the molds on said blow table including separable body sections and a bottom section, means for continuously rotating said tables at the same peripheral speed to move the molds on each table through a common arcuate path, means responsive to the rotation of said blow table for moving said body sections relative to each other to separate and close said molds, and means operable when said body sections are separated for moving the bottom section laterally with relation to said body sections.

10. A glass fabricating machine comprising a rotating press mold table, a blow mold table surrounding said press mold table and arranged eccentrically thereto a series of molds carried by each said table, the molds on said blow table each having separable body sections and a movable bottom section, means for continuously rotating said tables to move a mold on the press table into coaxial relation with a mold on said blow table, means associated with said press table for preshaping a charge of molten glass in successive molds on said table, means responsive to the rotation of said blow table for moving said body sections to close them around a preshaped charge and for separating said sections to deliver the ware therefrom, means associated with each of the molds on said blow table for blowing the charges to finished form while said molds are in their closed position, means actuated when said body sections are separated for moving the bottom section of each said mold laterally relative to the body sections thereof, and take-off means for engaging the ware on said bottom section and removing it therefrom.

11. A glass fabricating machine comprising in combination a rotatable press mold table, an annular blow mold table surrounding said press mold table and arranged eccentrically thereto, a series of molds carried by each said table, and means for rotating said tables at the same peripheral speed to move a mold on the press table into coaxial relation with a mold on the blow table.

12. A glass fabricating machine comprising in combination a rotatable press mold table, a rotatable annular blow mold table surrounding said press mold table and arranged eccentrically thereto, means for causing said tables to rotate together, and means for continuously rotating said tables to move the molds on each table for a portion of their travel through a common arcuate path with the molds on one table in coaxial alignment with the molds on the other table.

13. A glass fabricating machine comprising a rotatable press mold table having a series of two-part parison molds thereon, a rotatable annular blow mold table having a series of divided blow molds thereon, said blow mold table surrounding said press mold table and arranged eccentrically thereto whereby the molds on the blow mold table traverse for a portion of their travel an arcuate path common to the path of travel of the press molds, means for rotating said tables at the same peripheral speed, means for effecting a transfer from the parison molds to the blow molds while said molds are travelling through the common arcuate path, means for blowing the articles in said blow molds, and means for discharging the blown articles from said blow molds.

14. A glass fabricating machine comprising in combination a rotatable press mold table, a rotatable annular blow mold table surrounding said press mold table and arranged eccentrically thereto, a series of divided parison molds carried by said press table, a series of divided blow molds carried by said blow mold table, means for rotating said tables at the same peripheral speed to move a mold on the press mold table into coaxial alignment with a mold on said blow mold table, and means for effecting a transfer from a parison mold to a blow mold while such molds are in coaxial alignment.

15. In a method of fabricating blown articles from molten glass the steps which consist in projecting successive charges of molten glass into the successive molds of a series and moving continuously in an annular path, forming the charges within said molds into parisons, introducing the parisons into the side of a second series of molds traveling continuously in an annular path surrounding the path of travel of the parison molds but eccentric thereto, blowing the parisons to shape and then moving the blown articles outwardly through the other sides of said second series of molds and relative to the centers of rotation thereof to remove the articles therefrom.

16. A glassware fabricating machine comprising a rotating press mold table having a series of parison molds thereon moving in a circular path from a charge receiving station to a transfer station, an annular rotating blow mold table surrounding said press mold table and having a series of blow molds on its inner periphery moving in a circular path from the transfer station to a discharge station, each of said blow molds comprising a body section and a bottom section, means for opening the parison molds and closing the blow molds at the transfer station, means for opening the blow molds at the delivery station, and means for moving the bottom section of each blow mold outwardly with relation to the center of rotation of said blow mold table to carry the glassware fabricated therein from the inner to the outer periphery of said table.

17. A glassware fabricating machine comprising a rotating press mold table having a series of parison molds thereon moving in a circular path from a charge receiving station to a transfer station, means for preshaping the charges in each of said parison molds, an annular rotating blow mold table surrounding said press mold table and having a series of blow molds on the inner periphery thereof moving in a circular path from the transfer station to a delivery station, means for opening the parison molds and closing the blow molds moving past said transfer station to transfer the preshaped parison from a parison mold to a blow mold, means for blowing the parisons in said blow molds, means for opening the blow molds at the delivery station, and means at the delivery station for moving the blown article outwardly with relation to the center of rotation of said blow mold table to remove the article therefrom.

18. A glassware fabricating machine comprising a rotating press mold table having a series of parison molds thereon moving in a circular path from a charge receiving station to a transfer station, means for preshaping the charges in said parison molds, an annular rotating blow mold table surrounding said press mold table and arranged eccentrically thereto, a series of blow molds on the inner periphery of said blow mold table moving in a circular path from the transfer station to a delivery station, means for opening the parison molds and closing the blow molds at the transfer station to transfer a parison from the parison mold to a blow mold, means for blowing the parisons in said blow molds, means for opening the blow molds at the delivery station, means for moving the blown articles outwardly at the delivery station with relation to the center of rotation of said blow mold table to transfer the blown articles from the inner to the outer periphery of the blow mold table, and means for removing the outwardly positioned articles from said blow mold table.

19. A glassware fabricating machine comprising a rotating press mold table having a series of parison molds thereon moving in a circular path from a charge receiving station to a transfer station, means for preshaping the charges in said parison molds, an annular rotating blow mold table surrounding said press mold table and arranged eccentrically thereto, a series of blow molds mounted on the inner periphery of said blow mold table and moving in a circular path from the transfer station to a delivery station, each of said blow molds having a body section and a bottom section, means for opening the parison molds and closing the blank molds moving past the transfer station to effect a transfer of a parison from a parison mold to a blow mold, means for blowing the parisons in said blow molds, means at the delivery station for opening the body sections of each said blow mold, means for moving the bottom section of each open blow mold outwardly with relation to the center of rotation of said blow mold table to transfer the blown articles from the inner to the outer periphery of said blow mold table, and take-off means for removing the blown article from the bottom section of said blow mold.

20. A glassware fabricating machine comprising a rotating press mold table having a series of parison molds thereon moving in a circular path from a charge receiving station to a transfer station, means for preshaping the charges in said parison molds, an annular rotating blow mold table surrounding said press mold table and arranged eccentrically thereto, a series of blow molds on the inner periphery of said blow mold table moving in a circular path from the transfer station to a delivery station, means for opening the parison molds and closing the blow molds moving past the transfer station to transfer a parison from a parison mold to a blow mold, means for blowing the parisons in said blow molds, and means at the delivery station for opening said blow mold and moving said article from the inner periphery to the outer periphery of said blow mold table.

21. A glassware fabricating machine comprising a rotating press mold table having a series of parison molds thereon moving in a circular path from a charge receiving station to a transfer station, means for preshaping the charges in said parison molds, an annular rotating blow mold table surrounding said press mold table and arranged eccentrically thereto, a series of blow molds mounted on the inner periphery of said blow mold table and moving in a circular path from the transfer station to a delivery station, means for effecting a transfer of the preshaped charges from said parison molds to said blow molds at the transfer station, means for blowing the preshaped charges in said blow molds into finished articles, means for opening said blow molds at the delivery station, means for moving the finished article from the inner to the outer periphery of said mold table, and means for removing said article from said table.

22. A glass fabricating machine comprising a substantially circular table, cooperating neck and blank molds carried by said table, an annular mold carrying table surrounding said first mentioned table and arranged eccentrically thereto, finishing molds carried by said annular table, means for continuously driving both said tables, and means for closing each finishing mold about a blank carried by one such blank mold and for effecting a transfer of such blank thereto by opening such neck mold while both tables are moving.

23. In a glass fabricating machine, a circular, mold-carrying table, an annular mold-carrying table surrounding said first mentioned table and arranged eccentrically thereto, means for rotating said tables in synchronism with each other, molds carried by each table, and timed means for closing a mold carried by one table and opening a mold carried by the other table to effect a transfer of blanks while both tables are moving.

24. A glass fabricating machine comprising a rotatable table, an annular table surrounding said first mentioned table and arranged eccentrically thereto, means for rotating said tables in synchronism with each other, molds carried by each table, means carried by one of such tables and cooperating with molds carried thereby for forming mold blanks, means carried by the other table and cooperating with molds thereof for completing such blanks into finished articles, and means operating in timed relation for closing a mold carried by one table about a blank carried by a mold of the other table and for opening such blank carrying mold to effect a transfer of such blank while both tables are moving.

25. A glass fabricating machine comprising a table having a series of cooperating neck and blank molds thereon, each of which is divided and adapted to be opened and closed independently of the other, a finishing table surrounding said first mentioned table and having a series of divided blow molds thereon adapted to be opened and closed, said finishing mold table being eccentric to said first mentioned table and so arranged relative thereto that the centers of the molds on each table traverse the same arcuate path for a portion of their travel, means for rotating said tables at the same peripheral speed, means carried by one such table and cooperating with the molds carried thereby for forming mold blanks, means carried by the other table and cooperating with the molds thereof for completing the fabrication of such blanks into finished articles, means for opening such blank molds prior to the movement thereof into the common arcuate path, and means operating in timed relation for closing a blow mold about a blank carried by the neck mold and for opening such neck mold to effect a transfer of such blank while both tables are moving.

26. A glass fabricating machine comprising a rotatable press table having a series of blank molds thereon, means for continuously rotating said table to move the molds thereon in a circular path from a charge receiving position to a blank delivery position, means for pressing charges delivered to said molds at the charge receiving position, a rotatable finishing table surrounding said press table and arranged eccentrically thereto, a series of blow molds carried by said finishing table and arranged to travel through an arc coincident with a portion of the circular path of said blank molds at the blank delivery position, means for rotating said finishing table to move the blow molds thereon at the same peripheral speed as the blank molds, means operating in timed relation for closing the mold carried by the finishing table and opening a mold carried by the press table to effect a transfer of a blank while such molds are moving through such coincident arc of travel.

27. In combination in a glass fabricating machine, a rotatable parison-mold table, a rotatable blow-mold table surrounding said parison mold table, a series of separable parison molds carried by the parison mold table, a series of separable blow molds carried by the blow mold table, means for rotating said tables, means for transferring parisons formed in the parison molds to blow molds while both tables are moving including means for suspending each such parison while moving it through the open side of the blow mold adjacent the parison mold series, means for closing each blow mold around a parison so suspended, means for releasing the suspended parison to the closed blow mold, and means for delivering finished articles from the blow molds by moving each such article through the open side of the blow mold farthest removed from the parison mold series.

28. In combination in a glass fabricating machine, a series of separable parison molds, a series of separable blow molds located on one side of said parison series, means for delivering successive charges of molten glass to the successive molds of the parison series, means for moving both series of molds, means for transferring parisons formed in the parison molds to molds of the blow mold series including means for suspending each parison and for positioning it while suspended with relation to a mold of the blow mold series by moving it through an open side of such mold adjacent the parison molds, means for closing each blow mold around the suspended parison, and means for releasing the suspended parison to the closed blow-mold and means for removing finished articles from the successive blow molds by moving such articles through the open sides of said molds removed from said parison series.

29. In combination in a glass fabricating machine, a separable parison mold, a separable blow mold located at one side thereof, means for delivering a charge of molten glass into the parison mold while the parts thereof are in assembled relationship, means including a neck ring for moving a parison formed in the parison mold to position through the side of the blow mold adjacent the parison mold while parts of the blow mold are separated, means for closing the parts of the blow mold around the suspended parison, means for actuating the neck ring to release the parison to the blow mold, means for blowing the parison to finished form in the blow mold, means for opening the blow mold and means for moving the finished article therefrom through the side thereof farthest removed from the parison mold.

30. In combination in a glass fabricating machine, a separable parison mold, a separable blow mold located at one side of the parison mold, means for introducing a charge of molten glass into the parison mold while the parts thereof are in assembled relationship, means including a neck ring for suspending a parison formed in the parison mold and for introducing it while suspended through the open side of the blow mold adjacent the parison mold, means for closing the blow mold around the suspended parison, means for actuating the neck ring to release the parison to the blow-mold, and means including blow-mold opening means and the bottom of the blow-mold for removing the finished article from the open blow-mold by moving it through the open side thereof farthest removed from the parison mold.

31. In combination in a glass fabricating machine, a separable parison mold, a separable blow mold located at one side of said parison mold, means for introducing a charge of molten glass into said parison mold, means for suspending a parison formed in the parison mold and for introducing it while suspended through the open side of the blow-mold adjacent the parison mold, and means for removing the finished article from the blow mold by moving it through the open side thereof farthest removed from the parison mold.

FRANK L. O. WADSWORTH.